Aug. 22, 1950        O. O. OAKS        2,519,692

COOLING SYSTEM FOR INTERNAL-COMBUSTION ENGINES

Filed Aug. 26, 1947        2 Sheets-Sheet 1

INVENTOR.
Orion O. Oaks.
BY
Cameron, Kerkam + Sutton
ATTORNEYS

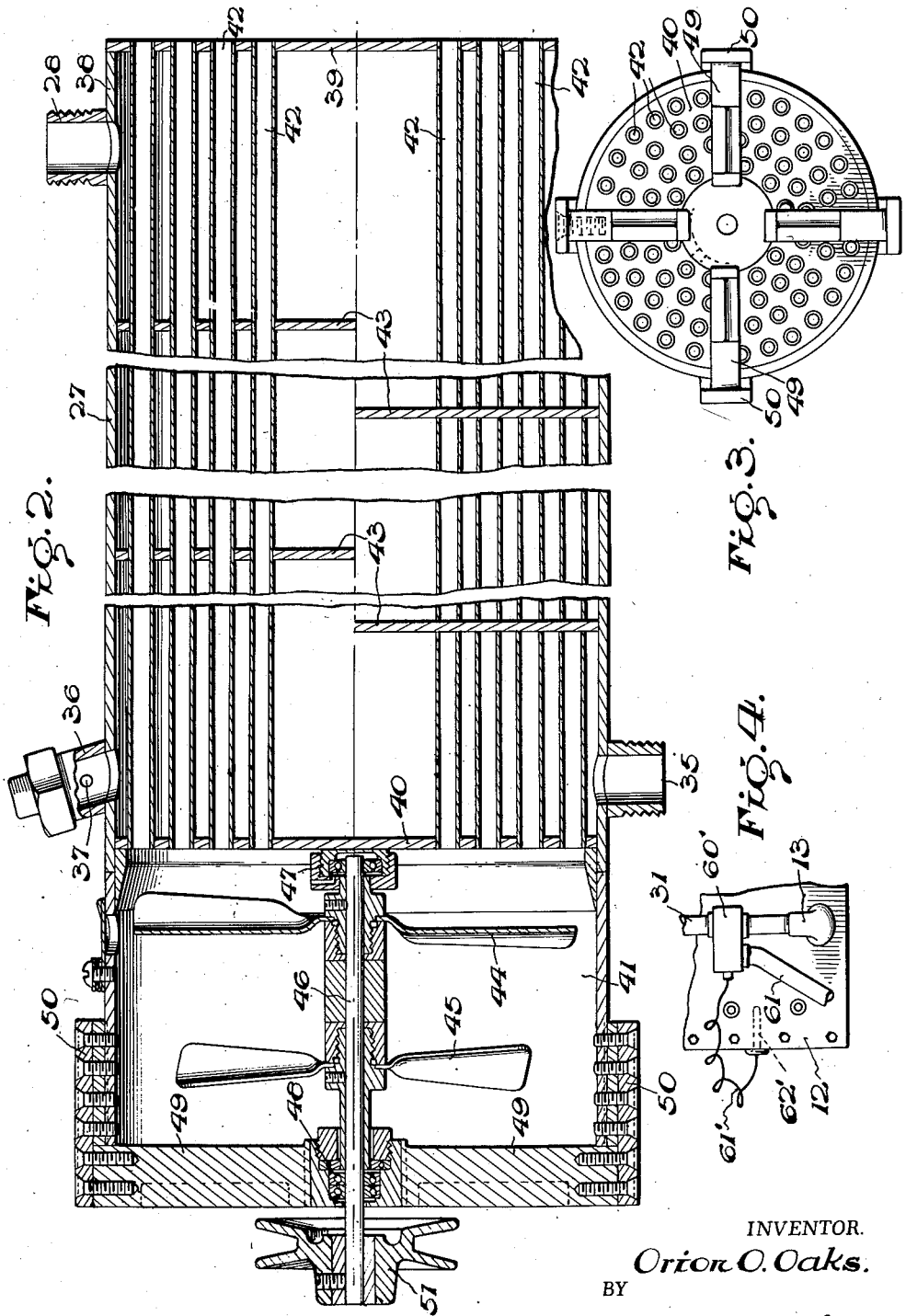

Patented Aug. 22, 1950

2,519,692

UNITED STATES PATENT OFFICE 2,519,692

COOLING SYSTEM FOR INTERNAL-COMBUSTION ENGINES

Orion Ottis Oaks, Summit, N. J., assignor, by mesne assignments, to Thermal Liquids, Inc., New York, N. Y., a corporation of Delaware Application August 26, 1947, Serial No. 770,572

11 Claims. (Cl. 123—170)

This invention relates to cooling systems for internal combustion engines and more particularly to such systems for use with a particular class of chemical compounds which are liquid over wide ranges of temperatures as the coolant.

Modern internal combustion engines, unless air cooled, are jacketed about the cylinders, valves, head, etc. and water is pumped through these spaces to cool the engine during operation. The heated water is then cooled by heat exchange with the outside air by passing through the conventional radiator. Because of the narrow temperature range of water between freezing and boiling, much difficulty has heretofore been experienced in obtaining proper cooling for liquid cooled engines. Further, it has been found necessary to operate such engines at temperatures below their most efficient operating temperatures to prevent boiling off of the water. During cold weather it has been found necessary to add anti-freezing compounds to the water, thus depressing the boiling point of the same with resultant trouble in cooling during ensuing warmer weather.

By using the particular class of chemical compounds for which the engine cooling system of my invention is primarily intended I overcome all of these difficulties and, further, I am able to operate the engine at higher temperatures with increased efficiency. Among the chemical compounds which I may use as the coolant are the tetra-aryl ortho silicates whose properties are generally described in Johnston Patent #2,335,012 dated November 23, 1943. These compounds can be heated to upwards of 750° F. without boiling and may be cooled downward to approximately −70° F. without undue solidification. A temperature range such as this is more than adequate to meet normal and most subnormal operating conditions of internal combustion engines since the coldest weather which may normally be expected in the temperate zones is approximately −20° F. and the maximum operating temperature for such an engine is in the neighborhood of 230° F. By using these chemical compounds the engine cooling system may be filled when the engine is assembled and then sealed to all but abnormal pressure and vacuum conditions.

Further, because of the heat transfer characteristics of these compounds, I have found that they may be efficiently cooled by heat exchange with outside air by the use of less complicated and more simple types of radiating equipment than is now known and used. This simple radiating equipment results in lower initial costs of internal combustion engines. Fuel savings resulting from higher and more efficient operating temperatures are substantial and may amount to upwards of 40 per cent.

Accordingly, it is an object of the present invention to provide a novel cooling system for internal combustion engines utilizing a particular class of chemical compounds as the engine cooling medium.

Another object is to provide such a system for use with tetra-aryl ortho silicate as the engine cooling medium.

Another object is to provide such a system which permits engine operating temperatures to be increased for more efficient engine operation.

Another object is to provide such a system which may be filled with cooling medium when the engine is assembled and thereafter sealed to all but abnormal pressure and vacuum conditions.

Another object is to provide such a system which utilizes a relatively simple and cheap heat transfer mechanism for cooling the engine cooling medium.

Another and still further object is to provide such a system which will permit engine operation in all temperatures normally to be expected, without change of the cooling medium.

Another object is to provide such a system with simple adjustable means provided therein for readily and accurately controlling engine operating temperatures.

Another object is to provide such a system which not only may be utilized to cool the engine but may also be used to heat the interior of a vehicle associated with the engine.

Another object is to provide such a system which may be readily installed on existing engines; which is cheap and easy to manufacture; and which will be efficient under all operating conditions.

Other and further objects of my invention will appear from the following description.

One embodiment of the present invention is shown in the accompanying drawings to illustrate my invention. This should in no way be construed as defining or limiting this invention and reference should be had to the appended claims for this purpose.

In the drawings, in which like reference characters designate like parts:

Fig. 2 is a longitudinal cross-sectional view of one of the heat transfer units shown in Fig. 1;

Fig. 3 is a view of one of the heat transfer units shown in Fig. 1 as seen from the front with the air impellers removed; and Fig. 4 is a fragmentary view of a part of Fig. 1 showing a thermostatically controlled valve in the by-pass.

Figure 1:
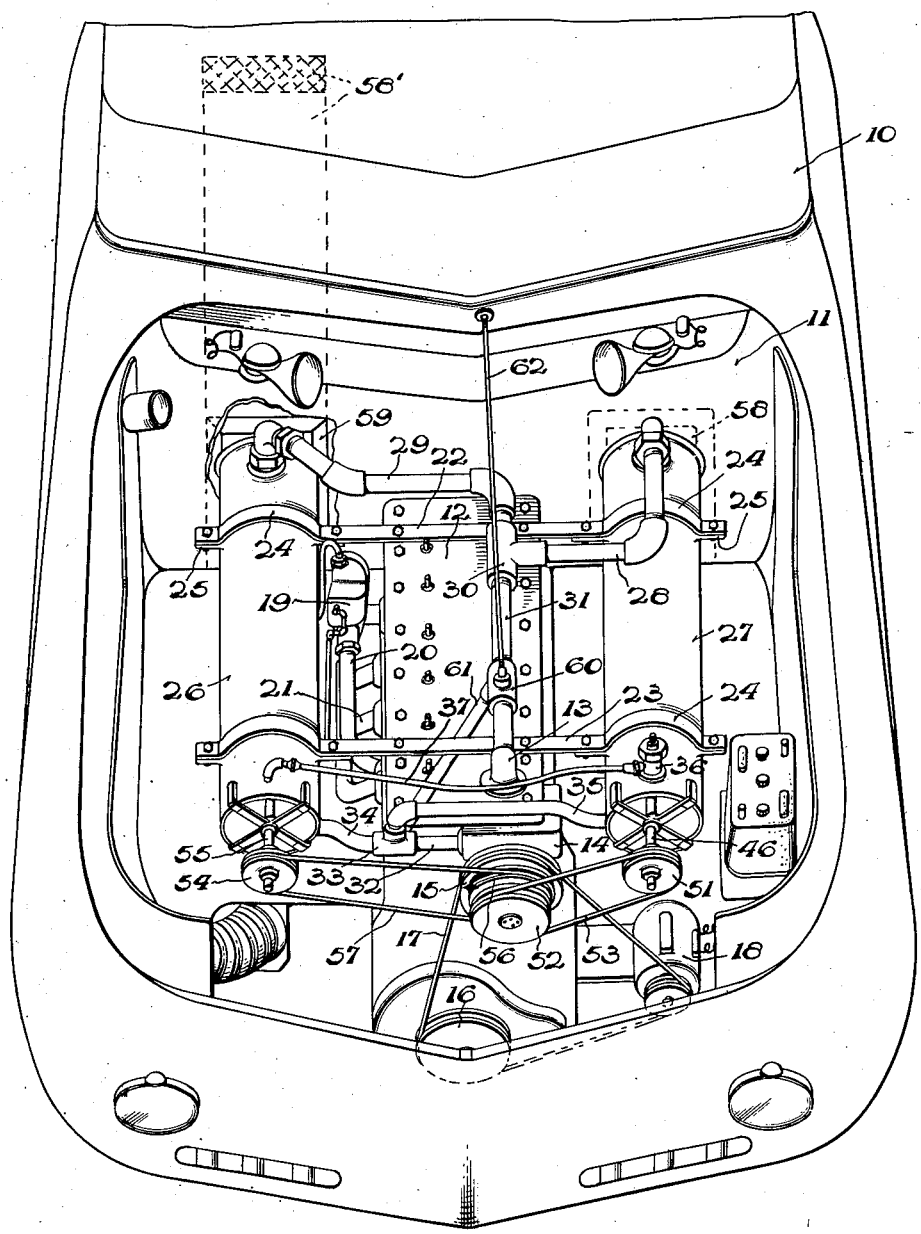
Fig. 1 is a view of an embodiment of my invention as applied to the internal combustion engine of an automobile as seen looking down upon the engine from the front with the hood removed.

As seen in the several views, an automobile 10 is provided with an engine compartment 11 in which is mounted in the conventional way any suitable internal combustion engine 12 provided with conventional cooling jackets about the cylinders, valves, head, etc., not shown. Cooling medium, tetra-aryl ortho silicate, is taken from these jackets through fitting 13 and is supplied to the jackets by a conventional pump 14 driven by pulley 15 which is in turn driven by pulley 16 mounted on the engine crank shaft and a belt 17. As here shown, pulley 16 and belt 17 also drive a generator 18 in the usual way. Engine 12 is provided with a carburetor 19, intake manifold 20 and exhaust manifold 21, all in the conventional manner.

A pair of straps 22 and 23 extend across engine 12 and are curved at 24 and provided with complementary curved bracket elements 25 to support one or more, here shown as two, heat transfer mechanisms 26 and 27 preferably spaced from and parallel to engine 12. Heated tetra-aryl ortho silicate is taken from the engine jackets and is supplied to mechanism 27 through pipes 31 and 28. Pipe 31 is coupled at 30 to pipe 29 to supply heated tetra-aryl ortho silicate to mechanism 26. Cooled tetra-aryl ortho silicate is taken from mechanisms 26 and 27 by pump 14 which is coupled to them by pipes 34 and 35, coupling 33 and pipe 32, and delivered to the engine cooling jackets.

As generally indicated above, the cooling system of the present invention, employing tetra-aryl ortho silicate as the cooling medium, is a closed system sealed from the atmosphere except under abnormal pressure and vacuum conditions. Mechanism 27 is provided with any suitable pressure and vacuum responsive valve 36 and mechanism 26 is vented to valve 36 by tubing 37. Valve 36 is preset to operate only when undesirable conditions of pressure or vacuum exist in the system and because of the unusual characteristics of tetra-aryl ortho silicate may never be actuated but should be included as a safety feature in the system.

In Fig. 2 a longitudinal cross-section of heat transfer mechanism 27 is shown and comprises a cylindrical metal shell 38 closed at one end by a header 39 and closed adjacent its other end by header 40, header 40 being sufficiently spaced from its adjacent end to provide an impeller chamber 41. A plurality of tubular air ducts 42 pass through headers 39 and 40 and form fluid tight seals therewith. Ducts 42 may be supported intermediate of their ends by any suitable number of brackets 43. Heated tetra-aryl ortho silicate entering cylinder 38 through pipe 28 will then flow downwardly over air ducts 42 in heat interchange relation therewith. Ducts 42 are cooled by the passage of air therethrough and will cool the tetra-aryl ortho silicate. The cooled tetra-aryl ortho silicate then leaves cylinder 38 by pipe 35.

Air impellers may be used to assist the flow of cooling air through ducts 42 and are here shown as comprising a pair of axial flow fans 44 and 45 mounted for rotation upon shaft 46 which is mounted at one end in a suitable bearing 47 carried by header 40 and supported by a suitable bearing 48 carried by spider 49 which is secured at 50 to cylinder 38. A pulley 51 is secured to shaft 46 to rotate the same and is driven by a pulley 52 coaxially secured to pulley 15 and by a suitable belt 53.

Heat transfer mechanism 26 is identical in structure to mechanism 27 and its fans are driven by pulley 54 secured to a fan shaft 55 and driven by a pulley 56 coaxially secured to pulley 15 and driven by a belt 57.

Air ducts 58 and 59 are arranged at the air discharge end of mechanisms 27 and 26 respectively, and lead the air off and discharge the same beneath the car. Branch ducts 58' may be provided leading from ducts 58 and 59 to supply heated air to an enclosure such as the interior of the automobile, if desired.

With the embodiment of my novel sealed cooling system constructed as above described and containing tetra-aryl ortho silicate, when engine 12 is started pump 14 will be driven and will circulate the tetra-aryl ortho silicate from the engine cooling jackets through pipes 31, 28 and 29 to heat exchange mechanisms 26 and 27 where the same will be cooled by contact with air cooled ducts 42. The cooled tetra-aryl ortho silicate will then pass through pipes 34 and 35 and pipe 32 to pump 14 and then to the engine jackets. Fans 44 and 45 will be driven during all periods of engine operation and will pass enough air through ducts 42 to adequately cool the same when the automobile is not in motion. When the automobile is placed in motion and additional demand is placed upon engine 12, raising its temperature, additional air will be forced through ducts 42 by the motion of the automobile and will supply the necessary additional cooling for the tetra-aryl ortho silicate.

Means for controlling the operating temperature of engine 12 may be provided and may be either automatic or under the manual control of the driver of the automobile. As seen in Fig. 1, this control means comprises a valve 60 in pipe 31 having a by-pass 61 leading therefrom and connecting to fitting 33. Valve 60 may be automatically operated by any thermostatic controls subject to engine temperatures or may be manually controlled by the driver of the automobile through operating rod 62. When valve 60 is closed the tetra-aryl ortho silicate is by-passed through pipe 61 back to pump 14 and the engine jackets and does not pass through mechanisms 26 and 27, thus allowing its temperature and that of the engine to increase. When valve 60 is open all of the tetra-aryl ortho silicate passes to mechanisms 26 and 27 and maximum cooling is obtained. By adjusting valve 60 to intermediate positions between closed and open, desirable degrees of cooling of the tetra-aryl ortho silicate may be obtained and any desirable engine operating temperature promptly and accurately reached.

Fig. 4 illustrates a thermostatically operated valve 60' controlling by-pass 61. Valve 60' may be any conventional thermostatically operated valve energized by bulb 62' set in the block of engine 12 and connected to valve 60' by tubing 61', all in the conventional way. When engine 12 is cold valve 60' is shut and all of the tetra-aryl ortho silicate is by-passed allowing it to be heated rapidly. As engine 12 and the tetra-aryl ortho silicate heat bulb 62' is heated and valve 60' opens allowing increasing amounts of the tetra-aryl ortho silicate to pass to mechanisms 26 and 27. When the desired engine operating temperature is reached valve 60' is opened enough to permit sufficient cooling of the tetra-aryl ortho silicate to maintain this desired engine temperature.

It will now be apparent that by the present invention I have provided a novel cooling system for internal combustion engines which is primarily intended for use with tetra-aryl ortho silicate as the cooling medium; which permits increased and more efficient engine operating temperatures; which is sealed to the atmosphere except under extreme conditions of pressure or vacuum therein; which utilizes relatively simple heat transfer mechanisms; which provides a simple means for controlling engine operating temperatures; which permits engine operation in all temperatures normally to be expected without modification of the cooling medium; which may be used to heat the interior of a vehicle associated with the engine; which may be readily installed on existing engines; and which is cheap and easy to manufacture.

Changes to or modifications of the illustrative embodiment of my invention above described may now be suggested to those skilled in this art without departing from the concept of my invention. Reference should be had to the appended claims to determine the scope of this invention.

What is claimed is:

1. A closed cooling system for internal combustion engines having cooling jackets and using tetra-aryl ortho silicate as the cooling medium comprising a plurality of elongated heat transfer mechanisms spaced from and extending parallel to the engine cooled by the axial flow of air therethrough to cool the tetra-aryl ortho silicate, fans mounted in said mechanisms driven by the engine and forcing air therethrough, a tetra-aryl ortho silicate circulating pump driven by the engine and connecting on its discharge side to the intake side of the engine jackets, means for connecting the discharge side of the engine jackets to the intake side of said heat transfer mechanisms, means for connecting the discharge side of said heat transfer mechanisms to said pump, and a pressure and vacuum relief valve connected in the system.

2. A cooling system for internal combustion engines having cooling jackets and using tetra-aryl ortho silicate as the cooling medium comprising one or more elongated heat transfer mechanisms spaced from and extending parallel to the engine cooled by the axial flow of air therethrough to cool the tetra-aryl ortho silicate, a pump for circulating the tetra-aryl ortho silicate through the engine jackets and through said heat transfer mechanisms, means connecting said pump to the engine jackets, means connecting the engine jackets to said heat transfer mechanism, and means connecting said heat transfer mechanism to said pump.

3. A heat transfer mechanism for use in internal combustion engine cooling systems employing tetra-aryl ortho silicate as the cooling medium comprising an elongated housing, a header closing one end of said housing, a second header spaced from the other end of said housing and closing said housing internally, tubular air ducts extending between and opening through said headers, air impellers mounted within said housing between the second of said headers and the adjacent end of said housing, means for bringing the heated tetra-aryl ortho silicate into heat transfer relationship with said air ducts, and means for removing the cooled tetra-aryl ortho silicate from said housing.

4. A heat transfer mechanism as defined in claim 3 in which a normally closed pressure and vacuum responsive valve is in communication with the interior of said housing between said headers.

5. A system for cooling an internal combustion engine and for heating the interior of an enclosure adjacent thereto and using tetra-aryl ortho silicate as the heat transfer medium comprising one or more elongated heat transfer mechanisms spaced from and extending parallel to the engine cooled by the axial flow of air therethrough to cool the tetra-aryl ortho silicate, a pump for circulating the tetra-aryl ortho silicate through the engine jackets and through said heat transfer mechanism, and one or more ducts leading from the air discharge end of said heat transfer mechanism and discharging into the enclosure.

6. A closed cooling system for internal combustion engines having cooling jackets and using an organic silicate as the cooling medium comprising a plurality of heat transfer mechanisms cooled by the axial flow of air thereto to cool the organic silicate, fans mounted in said mechanisms driven by the engine and forcing air therethrough, an organic silicate circulating pump driven by the engine and connecting on its discharge side to the intake side of the engine jackets, means for connecting the discharge side of the engine jackets to the intake side of said heat transfer mechanisms, means for connecting the discharge side of said heat transfer mechanism to said pump, a pressure and vacuum relief valve connected in the system, and a by-pass connected in the system to by-pass the organic silicate around said heat transfer mechanisms and to pass the same directly from the engine jackets to said pump, and means for controlling the flow of organic silicate through said by-pass.

7. A closed cooling system for internal combustion engines having cooling jackets and using an organic silicate as the cooling medium comprising a plurality of heat transfer mechanisms cooled by the axial flow of air therethrough to cool the organic silicate, fans mounted in said mechanisms driven by the engine and forcing air therethrough, an organic silicate circulating pump driven by the engine and connected on its discharge side to the intake side of the engine jackets, means for connecting the discharge side of the engine jackets to the intake side of said heat transfer mechanisms, means for connecting the discharge side of said heat transfer mechanisms to said pump, a pressure and vacuum relief valve connected in the system, a by-pass connected in the system to by-pass the organic silicate around said heat transfer mechanisms and to pass the same directly from the engine jackets to said pump, and manual means for controlling the flow of organic silicate through said by-pass.

8. A closed cooling system for internal combustion engines having cooling jackets and using an organic silicate as a cooling medium comprising a plurality of heat transfer mechanisms cooled by the axial flow of air therethrough to cool the organic silicate, fans mounted in said mechanisms driven by the engine and forcing air therethrough, an organic silicate circulating pump driven by the engine and connected on its discharge side to the intake side of the engine jackets, means for connecting the discharge side of the engine jackets to the intake side of said heat transfer mechanisms, means for connecting the discharge side of said heat transfer mechanisms to said pump, a pressure and vacuum relief valve connected in the system, a by-pass connected in the system to by-pass the organic silicate around said heat transfer mechanisms and to pass the same directly from the engine jackets to said pump, and thermostatic means responsive to engine temperatures for controlling the flow of organic silicate through said by-pass.

9. A cooling system for internal combustion engines having cooling jackets and using an organic silicate as the cooling medium comprising one or more heat transfer mechanisms cooled by the axial flow of air therethrough to cool the organic silicate, a pump for circulating the organic silicate through the engine jackets and through said heat transfer mechanisms, means for connecting said pump to the engine jackets, means for connecting the engine jackets to said heat transfer mechanisms, means connecting said heat transfer mechanisms to said pump, a by-pass connected in the system to by-pass the organic silicate around said heat transfer mechanisms and to pass the same directly from the engine jackets to said pump, and means for controlling the flow of organic silicate through said by-pass.

10. A cooling system for internal combustion engines having cooling jackets and using an organic silicate as the cooling medium comprising one or more heat transfer mechanisms cooled by the axial flow of air therethrough to cool the organic silicate, a pump for circulating the organic silicate through the engine jacket and through said heat transfer mechanism, means connecting said pump through the engine jacket, means connecting the engine jackets to said heat transfer mechanism, means connecting said heat transfer mechanism to said pump, a by-pass connected in the system to by-pass the organic silicate around said heat transfer mechanism and to pass the same from the engine jackets to said pump, and manually operable control means in said by-pass for controlling the flow of organic silicate therethrough.

11. A cooling system for internal combustion engines having cooling jackets and using an organic silicate as the cooling medium comprising one or more heat transfer mechanisms cooled by the axial flow of air therethrough to cool the organic silicate, a pump for circulating the organic silicate through the engine jackets and through said heat transfer mechanism, means for connecting said pump to the engine jackets, means for connecting the engine jackets to said heat transfer mechanism, means connecting said heat transfer mechanism to said pump, a by-pass connected in the system to by-pass the organic silicate around said heat transfer mechanism and to pass the same from the engine jackets to said pump, and engine operating temperature control means including a valve responsive to engine temperatures mounted in said by-pass.

ORION OTTIS OAKS.

REFERENCES CITED

The following references are of record in the file of this patent:

UNITED STATES PATENTS

| Number | Name | Date |
|---|---|---|
| 1,343,494 | Bolger | June 15, 1920 |
| 1,404,304 | DeLaMonte | Jan. 24, 1922 |
| 1,747,868 | Guernsey | Feb. 18, 1930 |
| 1,870,378 | Noblitt et al. | Aug. 9, 1932 |
| 2,095,058 | Cross | Oct. 5, 1937 |
| 2,335,012 | Johnston | Nov. 23, 1943 |